United States Patent Office 3,494,911
Patented Feb. 10, 1970

3,494,911
PHENYLAZONAPHTHYL DYESTUFFS CONTAINING A DIHALOPROPIONYL AMINO OR AN α-HALOACRYLOYLAMINO GROUP
Rene de Montmollin, Riehen, Switzerland, assignor to Ciba Limited, Basel, Switzerland, a company of Switzerland
No Drawing. Continuation-in-part of application Ser. No. 478,478, Aug. 9, 1965. This application Apr. 4, 1968, Ser. No. 718,928
Claims priority, application Switzerland, Apr. 12, 1962, 4,463/62
Int. Cl. C09b 29/30, 29/34; D06p 3/14
U.S. Cl. 260—196                                        19 Claims

ABSTRACT OF THE DISCLOSURE

Monoazo dyestuffs especially suitable for dyeing wool in red shades with particular fastness to wet treatments and which correspond to the formula

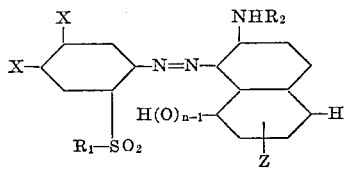

in which one X is hydrogen and the other X represents a member selected from the group consisting of $\alpha:\beta$-dichloropropionylamino, $\alpha:\beta$ - dibromopropionylamino, α-chloroacryloylamino and α-bromoacryloylamino, $R_1$ represents a member selected from the group consisting of seulfonated phenyl, sulfonated chlorophenyl and sulfonated toluyl, $R_2$ represents a member selected from the group consisting of hydrogen, methyl and phenyl, Z represents a member selected from the group consisting of sulfonic acid and sulfonic acid amide substituted by a member selected from theg roup consisting of methyl and phenyl, and $n$ represents a whole number of one to two.

This is a continuation in part of my application Ser. No. 478,478, filed Aug. 9, 1965, and now abandoned, which in turn is a continuation in part of my application Ser. No. 271,562, filed Apr. 9, 1963, now abandoned.

It is an object of the present invention to provide wool dyestuffs which yield red dyeings particularly fast to wet treatments, such as potting, fulling and especially washing, for instance, washing of chlorinated wool in the washing-machine at 80–85° C.

It is a further object of the present invention to provide red i.e. reddish orange to reddish violet dyestuffs which do not change their shade under alkaline treatments.

Further objects of the invention will become evident from the following:

The present invention provides new, valuable monoazo dyestuffs of the formula

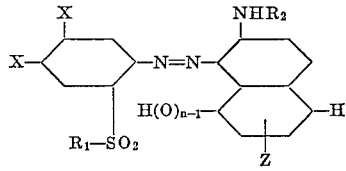

in which one X is hydrogen and the other X represents a member selected from the group consisting of the $\alpha:\beta$-dichloropropionylamino, $\alpha:\beta$-dibromopropionylamino, α-chloroacryloylamino and α-bromoacryloylamino radicals, $R_1$ represents a member selected from the group consisting of a sulfonated phenyl, a sulfonated chlorophenyl and a sulfonated toluyl radical, $R_2$ represents a member selected from the group consisting of hydrogen, methyl and phenyl, Z represents a member selected from the group consisting of a sulfonic acid group and a sulfonic acid amide group substituted by a member selected from the group consisting of methyl and phenyl, and $n$ represents a whole number of one to two.

The new monoazo dyestuffs can be prepared by coupling diazo compounds prepared from amines of the formula (2)
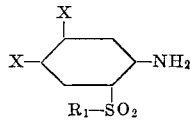

with coupling components of the formula (3)
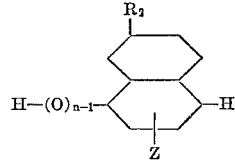

in which X, $R_1$, $R_2$, Z and $n$ have the meanings ascribed to them in Formula 1.

The amines of Formula 2 which are used as starting materials can advantageously be obtained by reacting 2:4-dinitro-chlorobenzene with an aryl sulfinate of the benzene series, for example, with the sodium salt of benzene sulfinic acid or para-chlorobenzene sulfinic acid or para-toluene sulfinic acid, and then introducing a sulfonic acid group into the said aryl radical by sulfonation of the condensation product, reducing both the nitro groups and selectively acylating the amino group in para-position to the sulfone group with an acid chloride or acid anhydride of chloro- or bromo-acrylic acid or of $\alpha:\beta$-dichloro-propionic acid or $\alpha:\beta$-dibromo-propionic acid; or they can be obtained by reacting 1,4-diaminobenzene with an arylsulphinate of the benzene series, for example, the sodium salt of benzene sulphinic acid, para-chlorobenzenesulphinic acid or para-toluenesulphinic acid, in the presence of iron (III) chloride, introducing a sulphonic acid group into the aforementioned aryl residue by sulphonation of the condensation product and selectively acylating the amino group in meta-position to the sulphone group with one of the aforementioned acid chlorides or anhydrides.

The condensation with the acid halides or anhydrides is advantageously carried out in the presence of an acid-binding agent, for example, sodium carbonate. All these reactions should naturally be carried out in such a manner that an unsaturated bond or an exchangeable halogen atom remains in the finished product.

As coupling components of the Formula 3 that can be used the following may be mentioned:

2-aminonaphthalene-6-sulfonic acid,
2-aminonaphthalene-7-sulfonic acid,
2-N-methylaminonaphthalene-6-sulfonic acid,
2-N-isobutylaminonaphthalene-6-sulfonic acid, 2-N-phenylaminonaphthalene-6-sulfonic acid,
2-amino-8-hydroxynaphthalene-6-sulfonic acid,
2-N-methylamino-8-hydroxynaphthalene-6-sulfonic acid,
2-N-isobutylamino-8-hydroxynaphthalene-6-sulfonic acid,
2-N-phenylamino-8-hydroxynaphthalene-6-sulfonic acid, and the corresponding compounds that contain, in 6-position, an unsubstituted or substituted sulfonic acid amide group instead of the sulfonic acid group, for example, the sulfonic acid-N-morpholide group or the sulfonic acid-N-methyl-, -ethyl-, isobutyl-, -$\beta$-hydroxyethyl-, 3'-methoxy-propyl-, -cyclohexyl-, furfuryl-, -dimethyl-, -diethyl-, -N-methyl-N-$\beta$-hydroxyethyl-, -phenyl-, -N-methyl-N-phenyl-, -N-$\beta$-hydroxyethyl-N-phenylamide group, and the phenyl-sulfonamides corresponding to the last three groups that contain, for example, chlorine or methyl substituents or carboxyl groups in the phenyl nucleus, for example, -N-methyl-anthranilamide.

The diazotization of the amines of the Formula 2 used as starting materials in the present process can be carried out by known methods, for example, with the aid of organic sulfonic acids, for example, $\alpha$-naphthalene sulfonic acid, or mineral acids especially hydrochloric acid, and sodium nitrite or it can be carried out by the methods normally used for compounds that are difficult to diazotize, for example, with the aid of nitrosyl sulfuric acid. In the last mentioned case it is often of advantage to separate the diazo compounds, for example, by diluting the diazotization mixture with water, filtering and then coupling. The coupling is carried out in an acid medium, for example, in a medium weakly acid to Congo red or in acetic acid. It is often of advantage to neutralize the free mineral acid formed during the coupling reaction, for example, with sodium acetate.

The isolation of the dyestuff from the coupling medium should naturally be carried out in such a manner that the reactive radical in the isolated product remains intact.

The new dyestuffs of the general Formula 1 can also be prepared by a modification of the present process wherein one mol of a monoazo dyestuff of the Formula 1, in which $R_1$, $R_2$, Z and $n$ have the aforesaid meanings and one X is hydrogen and the other X represents an acylatable amino group, is condensed with a reactive compound of the aforementioned type. The aminomonoazo dyestuffs used as starting materials in this process can be prepared by known methods, in that one of the aforementioned coupling components is coupled in an acid medium with a diazo compound which, in addition to the diazo group and the sulfone group in ortho-position thereto, contains, in meta- or para-position, a free amino group or a substituent convertible into a free amino group, such substituent being converted after the coupling, for example, by reduction or hydrolysis.

A further method of carrying out the process for the preparation of the dyestuffs which contain one halogen atom and a double bond in the reactive acyl radical comprises splitting off hydrogen halide from dyestuffs of the Formula 1, in which $R_1$, $R_2$, Z and $n$ have the aforesaid meanings and in which one X is hydrogen and the other X represents, for example, a dihalogenpropionylamino group. The dyestuffs used as starting materials in this process can be prepared according to the principle of the two first-mentioned manufacturing processes, that is to say, by coupling or condensation. In order to split off the hydrogen halide in the process of the invention, the aforesaid dyestuffs that contain an $\alpha$:$\beta$-dichloropropionylamino group or an $\alpha$:$\beta$-dibromopropionylamino group, are advantageously treated with an alkali metal hydroxide or carbonate or an alkaline earth metal hydroxide or carbonate at a low to moderately raised temperature.

However, dyestuffs that contain $\alpha$:$\beta$-dihalogenpropionylamino groups can also advantageously be used for dyeing without previously splitting off the hydrogen halide.

The dyestuffs obtained by the process of the invention and the modifications thereof are new. They are suitable for dyeing and printing a very wide variety of materials, especially those of animal origin, for example, leather, silk and more especially wool, and also a number of synthetic fibers, for example, those made from animalized rayon, polyamides, polyurethanes and the like. Whereas those dyestuffs of the invention that contain a sulfonic acid group in the coupling component are especially suitable for application from an acidic bath, e.g. a sulfuric acid bath, the dyestuffs that contain sulfonamide groups can also be applied with advantage from a weakly acid or neutral bath. In certain cases it is of advantage to add polyglycol ether derivatives or other polyethyleneoxide condensation products such as the condensation product of higher amines, for instance, oleylamine with 17 to 70 molecules of ethylene oxide to the dyebath in order to obtain level dyeings, which derivatives contain an average of at least ten —$CH_2$—$CH_2$—O— groups and which are derived from primary monoamines containing an aliphatic hydrocarbon radical having at least 20 carbon atoms. The dyeings and prints obtained with the new dyestuffs from a neutral or acid bath are distinguished by their valuable tints, their levelness and their good fastness to washing and milling, especially under alkaline conditions.

The following examples illustrate the invention. Unless otherwise stated, the parts and percentages are by weight:

EXAMPLE 1

125 parts of 30% hydrochloric acid were added to a neutral solution of 234 parts of 4$\alpha$:$\beta$-chloropropionylamino-2-amino-4'-methyl-1:1' - diphenylsulfone - 3' - sulfonic acid in 2000 parts of water, and the solution was diazotized at 10 to 15° C. in the usual manner with 125 parts by volume of a 4 N sodium nitrite solution. The diazo compound so obtained freed from nitrous acid was poured into a suspension prepared by dissolving 172 parts of 2-amino-8-hydroxy-naphthalene-6-sulfonic acid - N-methyl-N-phenylamide in 500 parts by volume of 2 N acetic acid. The whole was stirred at 20 to 25° C. until coupling was complete, whereupon 550 parts by volume of a 10 N sodium hydroxide solution were added to the coupling mixture and the whole stirred for about 3 hours at about 40° C., whereby the $\alpha$-$\beta$-chloropropionyl group was converted into the $\alpha$-chloro acryl group. The dyestuff suspension was then neutralized with about 200 parts by volume of 30% hydrochloric acid to give a weakly alkaline reaction (pH about 8), filtered, and the dyestuff so obtained was thoroughly washed with a 2% sodium chloride solution and dried in vacuo at 80 to 90° C. A red powder was obtained that dissolved in hot water and gave dyeings on wool or fibers made of polyamides having good properties of wet fastness.

The elimination of the hydrogen chloride could also be effected by rendering the coupling mixture slightly alkaline (pH 8 to 9) with about 300 parts by volume of a 10 N sodium hydroxide solution, adding 750 parts by volume of a 2 N sodium carbonate solution, stirring for 30 minutes at 80° C., filtering, washing the filter residue with a 2% sodium chloride solution and then drying in vacuo.

A dyestuff that dyes wool an orange tint can be obtained by coupling the above mentioned diazo compound with 2-aminonaphthalene-6-sulfonic acid-N-methyl-N - phenylamide in the manner described above and converting the resulting dichloro-propionylamino dyestuff into the corresponding monochloro-acrylic dyestuff by splitting off hydrogen chloride. However, the dyestuff that contains the dichloro-propionylamino group can also be used for dyeing before conversion.

EXAMPLE 2

To a neutral solution of 55.6 parts of 4-$\alpha$,$\beta$-dibromopropionylamino-2-amino-4'-methyl-1:1' - diphenylsulfone-3'-sulfonic acid in 500 parts of cold water were added 25 parts by volume of a 4 N sodium nitrite solution and thereafter 60 parts by volume of a solution containing 31% α-naphthalenesulfonic acid were poured in at once and stirred for about 30 minutes whereupon the diazotization was completed. The diazo compound so obtained was freed from nitrous acid and poured into a suspension of 22.3 parts of 2-aminonaphthalene-7-sulfonic acid in 200 parts of water containing 32.8 parts of anhydrous sodium acetate. The whole was stirred at 20 to 25° C. until coupling was complete, whereupon 30 parts by volume of a 10 N sodium hydroxide solution were added to the coupling mixture and the whole stirred for 30 minutes at room temperature, whereby the α-β-dibromopropionyl group was converted into the α-bromoacryl group. The dyestuff solution was then neutralized with about 5 parts by volume of 30% hydrochloric acid to a pH value of 7.0 and the dyestuff salted out by the addition of 80 parts of sodium chloride, then filtered and dried at 80 to 90° C.

An orange powder was obtained that dissolved in water and gave dyeings on wool having excellent properties of wet fastness.

Similar dyestuffs that dye wool the tints listed in column III of the following table can be obtained by coupling the diazo compounds of the amines listed in column I with the coupling components listed in column II in the matter described in the above example and converting the resutling di-halogen-propionylamino dyestuffs into the corresponding mono-halogen-acrylic dyestuffs by splitting off the hydrogen halide. However, dyestuffs that contain dihalogenpropionylamino groups can also be used for dyeing before conversion.

acylated after a short time. The dyestuff so obtained was precipitated in the usual manner by the addition of sodium chloride, filtered and dried. The dyestuff so obtained dyed wool red tints having good fastness to light and to wet treatment when applied from a bath acidified with acetic acid.

EXAMPLE 4

125 parts of 30% hydrochloric acid are added to a neutral solution of 228 parts of 5-(α,β-dibromopropionyl-amino) - 2 - amino - 4' - methyl - 1,1' - diphenylsulphone-3'-sulphonic acid in 2,000 parts of water, diazotization is carried out in the usual manner at 10 to 15° C. with 125 parts by volume of 4 N sodium nitrite solution and the small excess of nitrite is destroyed. A solution of 120 parts of 2-amino-8-hydroxynaphthalene-6-sulphonic acid in 500 parts by volume of N sodium hydroxide solution is slowly added dropwise to the diazo compound so obtained which is free from nitrous acid. The batch is stirred while adding dropwise 200 parts of 4 N sodium acetate solution at 20 to 25° C. until coupling is finished. 250 parts by volume of 10 N sodium hydroxide solution are then added to the coupling mixture which has been cooled to 10 to 15° C., and the batch is stirred for about 15 minutes at 10 to 15° C., whereby the α,β-dibromopropionyl group is converted into the α-bromoacrylic group. The dyestuff suspension so treated is then neutralized with 30% hydrochloric acid until it has a weakly alkaline reaction (about pH 8), filtered, the dyestuff is thoroughly washed with 15% sodium chloride solution, and then dried in vacuo

| | I | II | III |
|---|---|---|---|
| 1 | 4-α:β-dichloro-propionylamino-2-amino-4'-chloro-1:1'-diphenylsulfone-3'-sulfonic acid. | 2-aminonaphthalene-6-sulfonic acid | Orange. |
| 2 | 4-α:β-dichloro-propionylamino-2-amino-1:1'-diphenyl-sulfone-3'-sulfonic acid. | 2-(3'-methylphenyl)-amino-8-hydroxy-naphthalene-6-sulfonic acid. | Red violet. |
| 3 | 4-α:β-dichloro-propionylamino-2-amino-1:1'-diphenylsulfone-3'-sulfonic acid. | 2-phenylamino-naphthalene-6-sulfonic acid. | Red. |
| 4 | 4-α:β-dibromopropionyl-amino-2-amino-4'-methyl-1:1'-di-phenylsulfone-3'-sulfonic acid. | 2-amino-8-hydroxy-naphthalene-6-sulfonic acid. | Red. |
| 5 | do | 2-aminonaphthalene-6-sulfonic acid | Scarlet. |
| 6 | do | 2-(N-methyl)-amino-8-hydroxy-naphthalene-6-sulfonic acid. | Bluish red. |
| 7 | do | 2-(N-methyl)-amino-naphthalene-6-sulfonic acid. | Red. |
| 8 | 4-α:β-dichloropropionyl-amino-2-amino-1:1'-diphenyl-sulfone-3'-sulfonic acid. | do | Red. |
| 9 | do | 2-aminonaphthalene-6-sulfonic acid | Scarlet. |
| 10 | do | | |
| 11 | do | 2-amino-8-hydroxy-naphthalene-6-sulfonic acid. | Red. |

EXAMPLE 3

59.2 parts of the dyestuff of the formula

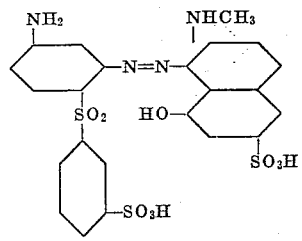

were neutralized in 1000 parts of water with a 2 N sodium hydroxide solution and then 16.4 parts of anhydrous sodium acetate were added. A solution of 25 parts of α:β-dibromopropionylchloride in 100 parts of acetone was added dropwise in the course of 30 minutes at 0 to 5° C. while stirring vigorously. The amino group was completely at 80 to 90° C. A red powder is obtained which dissolves in hot water and which dyes wool or polyamide fibres red-violet shades which are fast to wet treatments.

The same dyestuff is obtained by replacing the 228 parts of 5 - (α,β-dibromopropionylamino) - 2 - amino - 4' - methyl-1,1'-diphenylsulphone-3'-sulphonic acid with 180 parts of 5-(α-bromoacrylamino)-2-amino-4'-methyl-1,1'-diphenylsulphone-3'-sulphonic acid, and omitting the aftertreatment with sodium hydroxide solution.

Similar dyestuffs which dye wool the shades listed in column III of the following table may be obtained by coupling diazo compounds of the amines shown in column I with the coupling components listed in column II by the process described in the above example, and converting the dihalogenopropionylamino dyestuffs so obtained into the corresponding monohalogenoacrylic dyestuffs by splitting off hydrogen halide. However, the dyestuffs containing dihalogenopropionylamino groups may also be used for dyeing without being converted.

| | I | II | III |
|---|---|---|---|
| 1 | 5-(α,β-dibromopropionylamino)-2-amino-4'-methyl-1,1'-diphenylsulphone-3'-sulphonic acid. | 2-aminonaphthalene-6-sulphonic acid | Red. |
| 2 | do | 2-aminonaphthalene-5-sulphonic acid | Red. |
| 3 | do | 2-aminonaphthalene-7-sulphonic acid | Red. |
| 4 | 5-(α,β-dibromopropionylamino)-2-amino-1,1'-diphenylsulphone-3'-sulphonic acid. | 2-amino-8-hydroxynaphthalene-6-sulphonic acid. | Bluish red. |
| 5 | do | 2-N-methylamino-8-hydroxynaphthalene-6-sulphonic acid. | Red violet. |
| 6 | do | 2-aminonaphthalene-6-sulphonic acid | Red. |
| 7 | 5-(α,β-dichloropropionylamino)-2-amino-4'-chloro-1,1'-diphenylsulphone-3'-sulphonic acid. | do | Red. |
| 8 | 5-(α,β-dibromopropionylamino)-2-amino-1,1'-diphenylsulphone-3'-sulphonic acid. | 2-aminonaphthalene-5-sulphonic acid | Red. |
| 9 | do | 2-aminonaphthalene-7-sulphonic acid | Red. |
| 10 | 5-(α,β-dibromopropionylamino)-2-amino-4'-methyl-1,1'-diphenylsulphone-3'-sulphonic acid. | 2-methylaminonaphthalene-6-sulphonic acid. | Bluish red. |
| 11 | do | 2-aminonaphthalene-8-sulphonic acid | Red. |

Dyeing prescription 2 parts of the dyestuff obtained as described in Example 1 are dissolved in 4000 parts of water, 10 parts of crystalline sodium sulfate, 6 parts of acetic acid of 40% strength and 0.5 part of the addition product from oleylamine and ethylene oxide prepared as described below are added; 100 parts of well-wetted wool were placed in the dyebath so obtained at 40 to 80° C. The dyebath is brought to the boil in the course of ½ hour, and dyeing continued at the boil for ¾ hour. The bath is then cooled to 80° C. and given a pH value of 8.5 with ammonia, whereupon the wool is treated in this bath for another 20 minutes. On completion of the dyeing operation, the wool is rinsed with cold water and then dried. The wool is dyed a red tint fast to washing possessing good fastness to light.

Preparation of the addition product of ethylene oxide 100 parts of commercial oleylamine are mixed with 1 part of finely chopped sodium and the whole is heated to 140° C., whereupon ethylene oxide is introduced at 135 to 140° C. When ethylene oxide is being consumed rapidly, the reaction temperature is lowered to 120 to 125° C. and the introduction of ethylene oxide is continued until 113 parts thereof have been absorbed. The resulting reaction product gives an almost clear solution in water.

I claim:

1. Monoazo dyestuffs of the formula

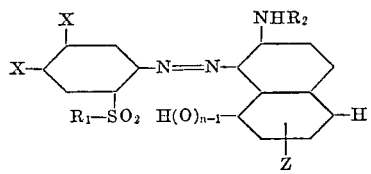

in which one X is hydrogen and the other X represents a member selected from the group consisting of α:β-dichloropropionylamino, α:β-dibromopropionylamino, α-chloroacryloylamino and α-bromoacryloylamino, $R_1$ represents a member selected from the group consisting of sulfonated phenyl, sulfonated chlorophenyl and sulfonated toluyl, $R_2$ represents a member selected from the group consisting of hydrogen, methyl and phenyl, Z represents a member selected from the group consisting of sulfonic acid and sulfonic acid amide substituted by a member selected from the group consisting of methyl and phenyl, and $n$ represents a whole number of one to two.

2. The monoazo dyestuff claimed in claim 1, which corresponds to the formula

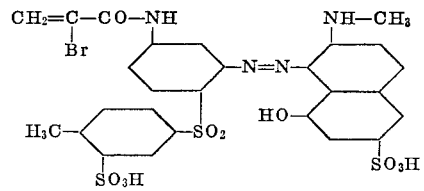

3. The monoazo dyestuff claimed in claim 1, which corresponds to the formula

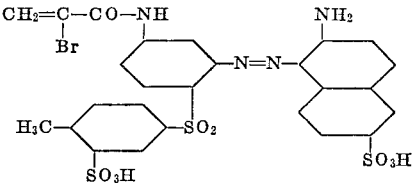

4. The monoazo dyestuff claimed in claim 1, which corresponds to the formula

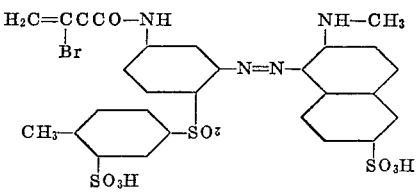

5. The monoazo dyestuff claimed in claim 1, which corresponds to the formula

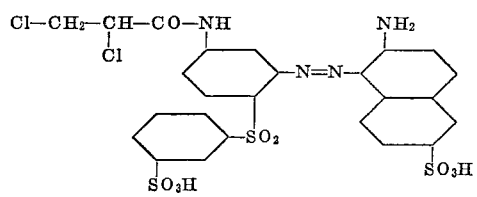

6. The monoazo dyestuff claimed in claim 1, which corresponds to the formula

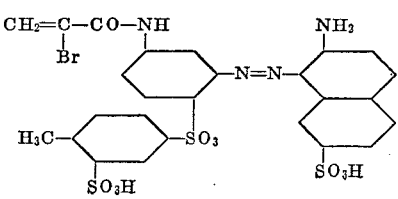

7. The monoazo dyestuff claimed in claim 1, which corresponds to the formula

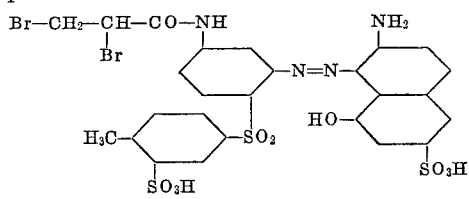

8. The monoazo dyestuff claimed in claim 1, which corresponds to the formula

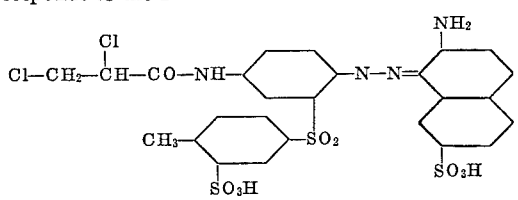

9. The monoazo dyestuff claimed in claim 1, which corresponds to the formula

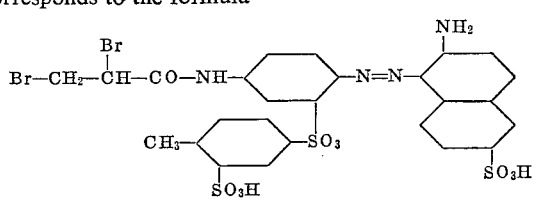

10. The monoazo dyestuff claimed in claim 1, which corresponds to the formula

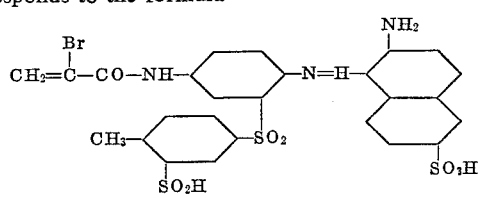

11. The monoazo dyestuff claimed in claim 1, which corresponds to the formula

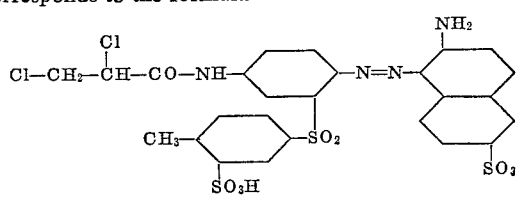

12. The monoazo dyestuff claimed in claim 1, which corresponds to the formula

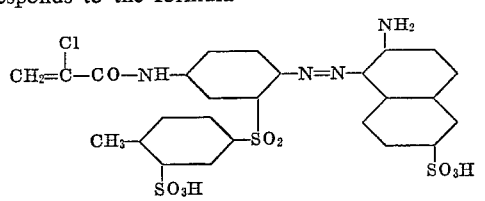

13. The monoazo dyestuff claimed in claim 1, which corresponds to the formula

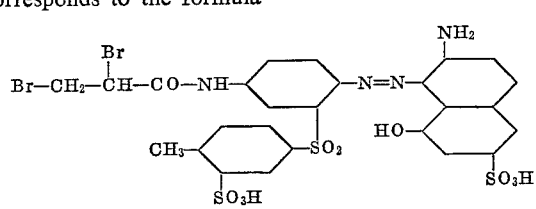

14. The monoazo dyestuff claimed in claim 1, which corresponds to the formula

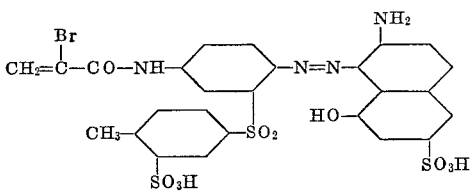

15. The monoazo dyestuff claimed in claim 1, which corresponds to the formula

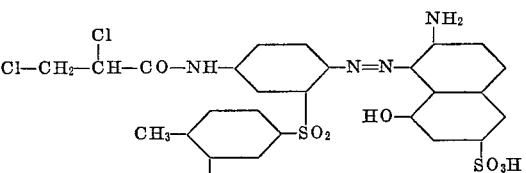

16. The monoazo dyestuff claimed in claim 1, which corresponds to the formula

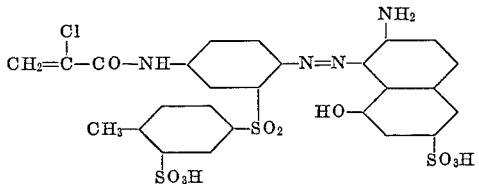

17. The monoazo dyestuff claimed in claim 1, which corresponds to the formula

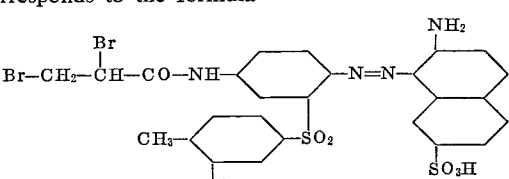

18. The monoazo dyestuff claimed in claim 1, which corresponds to the formula

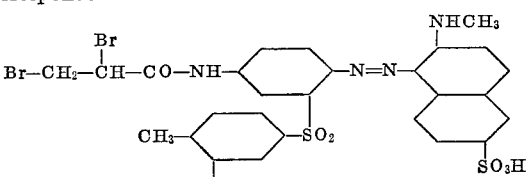

19. The monoazo dyestuff claimed in claim 1, which corresponds to the formula

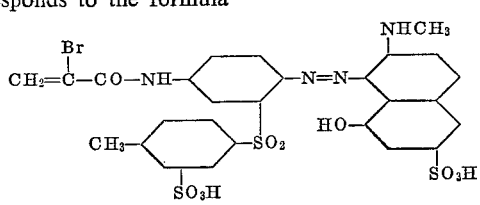

References Cited

UNITED STATES PATENTS

| | | | |
|---|---|---|---|
| 2,668,811 | 2/1954 | Zollinger et al. | 260—199 |
| 2,849,437 | 8/1958 | De Montmollin et al. | 260—196 |
| 3,045,005 | 7/1962 | Jung et al. | 260—199 XR |
| 3,126,368 | 3/1964 | Bossard et al. | 260—196 XR |
| 3,222,354 | 12/1965 | Lange | 260—196 XR |
| 3,316,239 | 4/1967 | Riat et al. | 260—196 XR |

FLOYD D. HIGEL, Primary Examiner

U.S. Cl. X.R.

8—41; 260—199, 562

CASE 5065/E/CIP-2

PO-1050
(5/69)

UNITED STATES PATENT OFFICE
CERTIFICATE OF CORRECTION

Patent No. 3,494,911                     Dated February 10, 1970

Inventor(s)    RENE DE MONTMOLLIN

It is certified that error appears in the above-identified patent and that said Letters Patent are hereby corrected as shown below:

Column 8, line 46, delete formula and insert ---

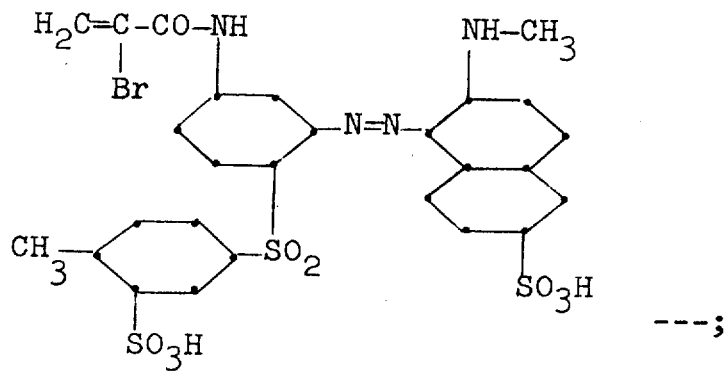

---;

Column 8, line 68, delete formula and insert ---

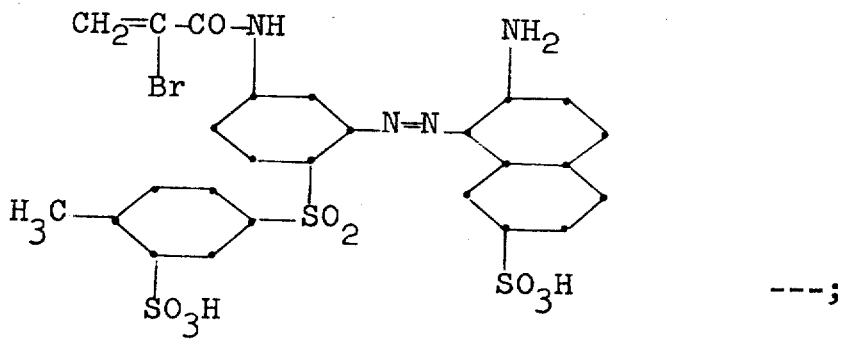

---;

Column 9, line 27, delete formula and insert ---

CASE 5065/E/CIP-2

PO-1050
(5/69)

UNITED STATES PATENT OFFICE
CERTIFICATE OF CORRECTION

Patent No. 3,494,911          Dated February 10, 1970

Inventor(s) RENE DE MONTMOLLIN

It is certified that error appears in the above-identified patent and that said Letters Patent are hereby corrected as shown below:

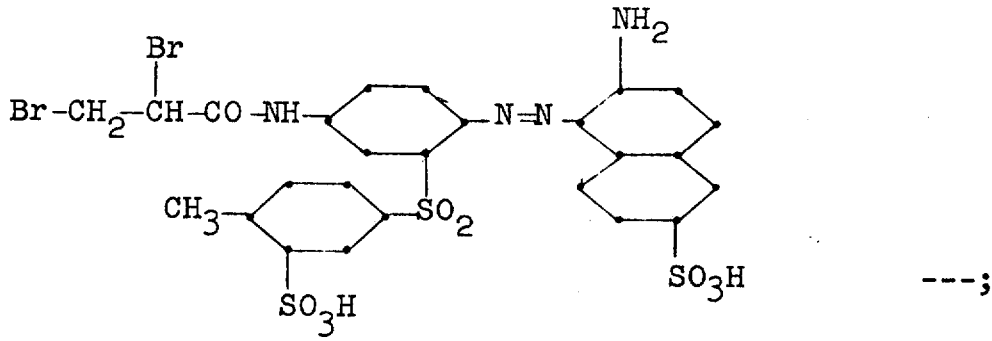

---;

Column 9, line 35, delete formula and insert ---

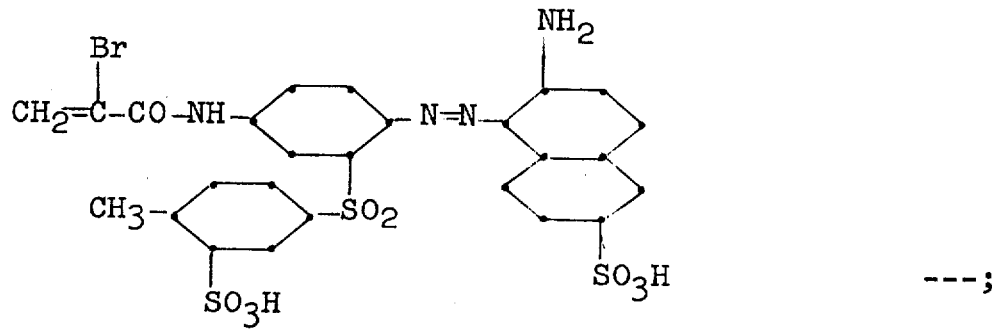

---;

Column 9, line 50, delete formula and insert ---

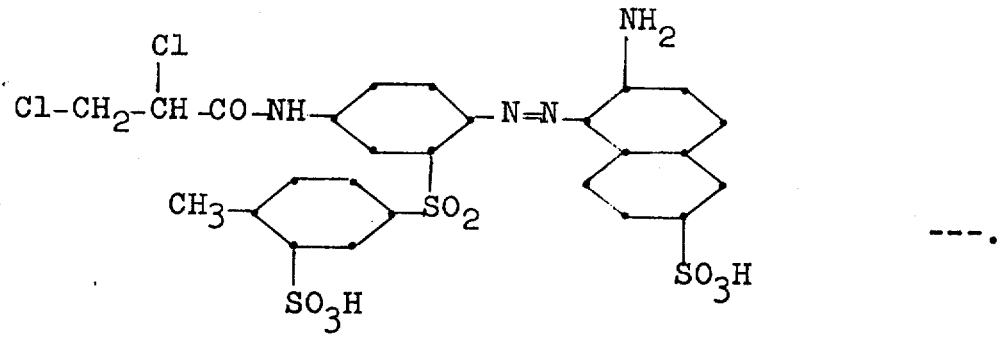

---.

UNITED STATES PATENT OFFICE
CERTIFICATE OF CORRECTION

Patent No. 3,494,911      Dated February 10, 1970

Inventor(s) RENE DE MONTMOLLIN      Page 3 of 3

It is certified that error appears in the above-identified patent and that said Letters Patent are hereby corrected as shown below:

SIGNED AND
SEALED
MAR 2 1971

(SEAL)
Attest:

Edward M. Fletcher, Jr.
Attesting Officer

WILLIAM E. SCHUYLER, JR.
Commissioner of Patents